Sept. 8, 1970          W. E. BENSON, JR          3,528,008
CONVERSION OF ANALOG MEASUREMENTS TO DIGITAL FORM
Filed June 24, 1965                              4 Sheets-Sheet 1
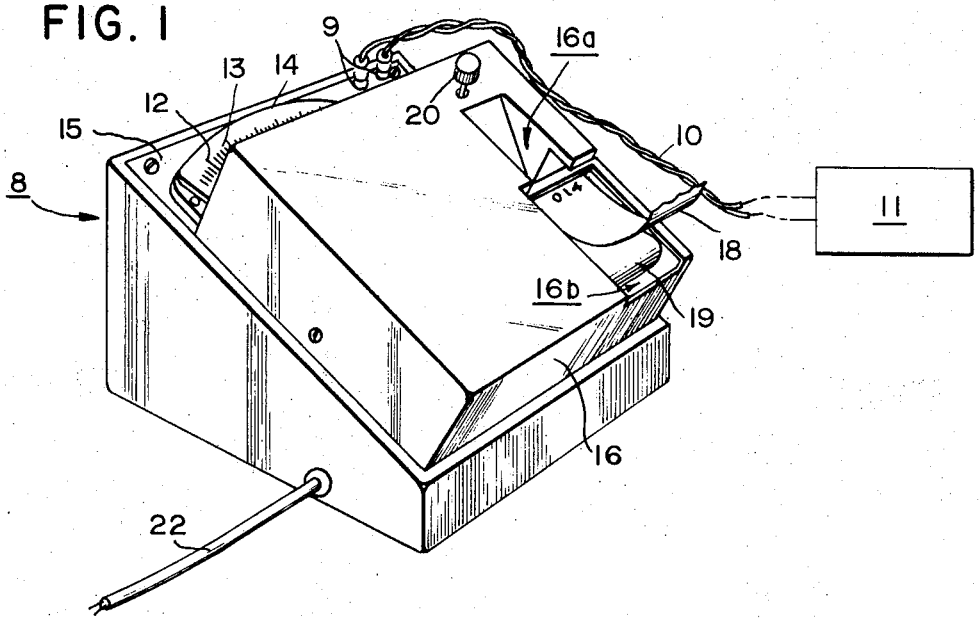
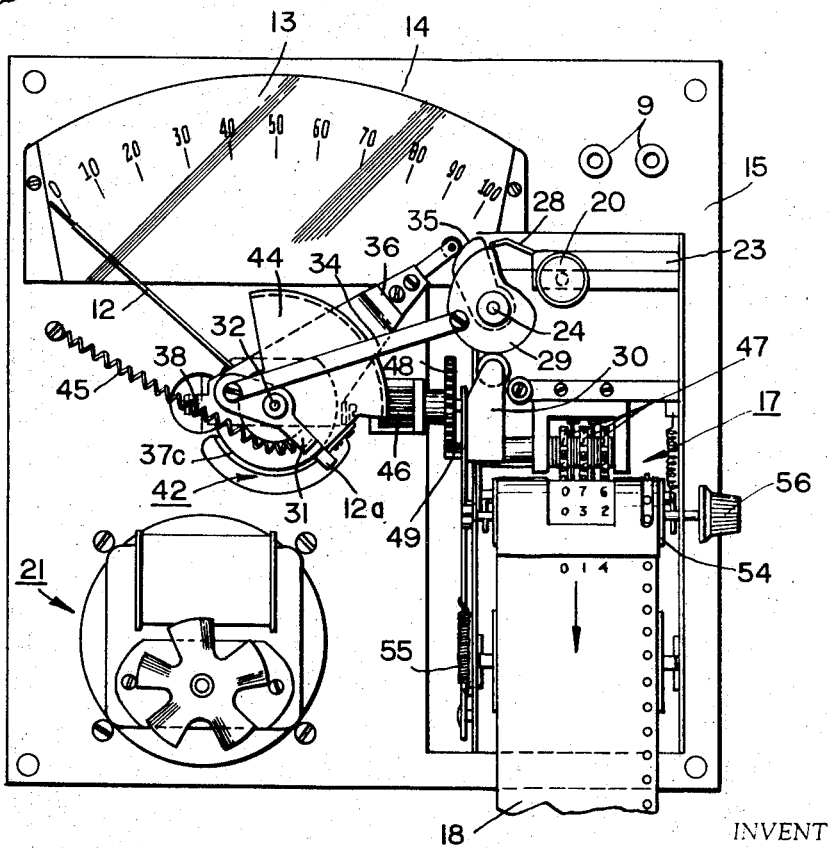
INVENTOR.
WARREN E. BENSON, JR.
BY
Dike, Thompson, Bronstein & Prose
ATTORNEYS

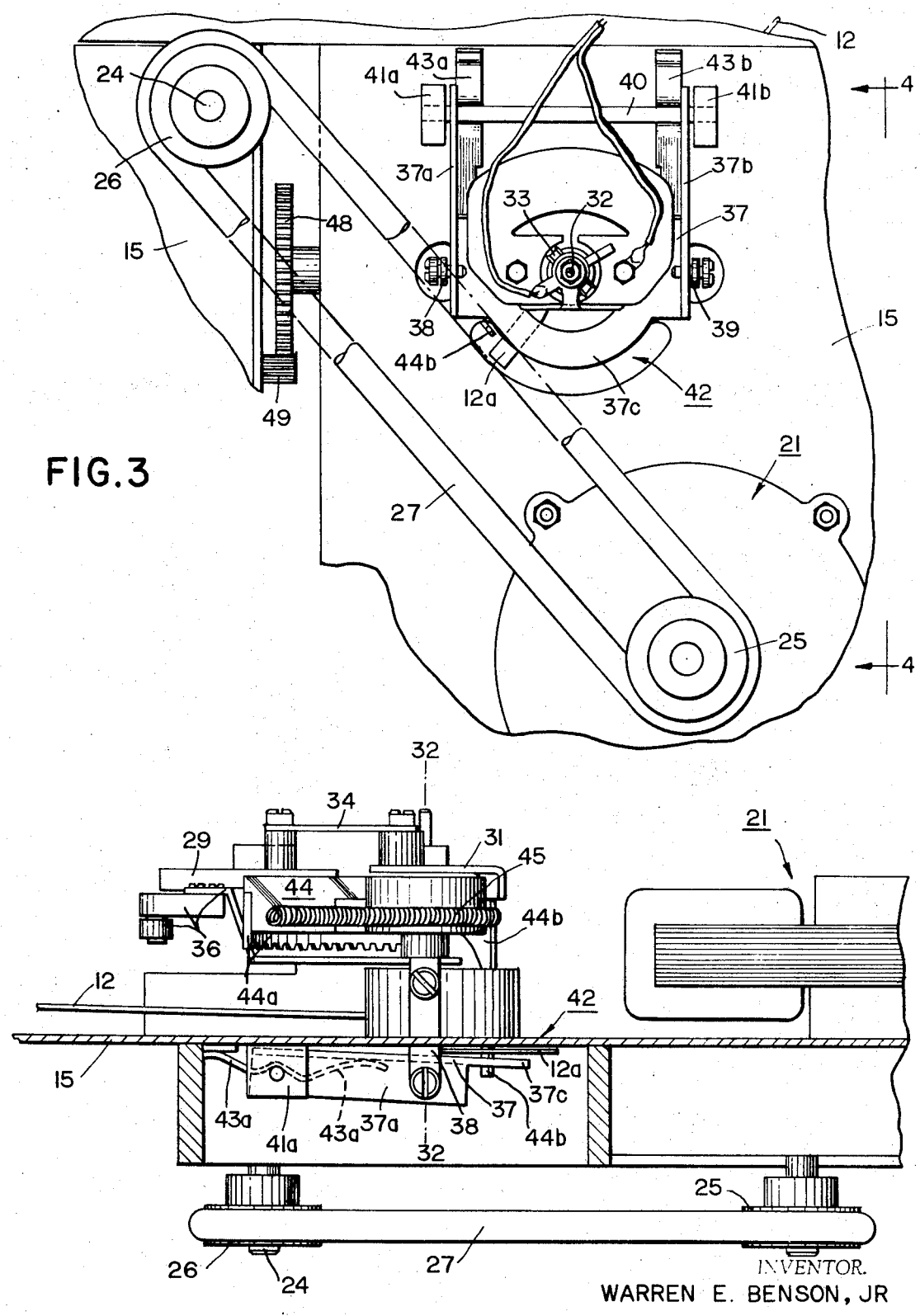

United States Patent Office 3,528,008
Patented Sept. 8, 1970

3,528,008
CONVERSION OF ANALOG MEASUREMENTS TO DIGITAL FORM
Warren E. Benson, Jr., Needham, Mass., assignor, by mesne assignments, to Kingsbury Technology Inc., Norwood, Mass., a corporation of Delaware
Filed June 24, 1965, Ser. No. 466,760
Int. Cl. G01r 13/04
U.S. Cl. 324—113     5 Claims

ABSTRACT OF THE DISCLOSURE

Method and apparatus in which analog measurements provided by a movable member, such as the pointer of a galvanometer, are converted into direct digital outputs by a mechanism which, when activated, (1) follows or seeks the measurement position of the movable member, which has been temporarily clamped in such position, and (2) operates a digital indicator, such as numerically engraved print wheels of a counter unit, in a manner determined by such position, to thereby digitally measure such position.

To provide a digital output for a particular analog measurement, the pointer is clamped and the follower is placed in motion, thus commencing to set the numerically engraved wheels of the counter unit. When the follower reaches the position of the pointer, it is stopped and the reading of the counter unit is the desired digital indication. The follower is subsequently returned to its rest position and the pointer is unclamped.

In one embodiment of the invention, the pointer is mounted for angular movement and has a clampable extension. The follower is mounted for angular movement about the pointer axis and is geared to the digital indicator. Initially the follower is held by a stop member which is also mounted on the pointer axis.

When a digital indication is desired, a motor causes the stop member to be oscillated and the pointer to be clamped. During the first half cycle of its oscillation, the stop member allows the follower to move to the position of the pointer where it is stopped by the clamped extension. During the second half cycle, the follower is returned to its rest position and the pointer is unclamped.

---

The present invention relates to improvements in the conversions of analog data into digital readouts, and, in one particular aspect, to novel and improved apparatus of low-cost and uncomplicated construction which accurately translates analog electrical information into automatically-printed records expressed in digital or numerical form.

It is commonly found that devices best suited for the economical and precise measurement, sensing, or translations of information are those which operate on an analog basis, by producing positional outputs which are directly related to the values of the information which they characterize. By way of illustration, sensitive electrical galvanometer-type movements are frequently utilized to indicate with great accuracy the measurement conditions expressed by the electrical output signals from a variety of forms of transducers or measurement systems. Translations of the instantaneous galvanometer indications into permanent records may involve periodic readings by an attendant, or may necessitate the use of costly recorder equipment, the traces of which also require interpretations by skilled personnel. For many purposes, it is desirable that the output indications instead be in digital terms, such as common numbers, and that these outputs be automatically printed; in the case of weight measurements, for example, it can be highly advantageous to provide a direct printed numerical readout of each sensed weight, and more sophisticated systems applications can further involve automatic calculations of cost, or other computations, based upon digital conversions of the measurements. Past practices aimed at satisfying these requirements have included the use of null-balance electrical servo mechanisms or of special-purpose digital electronic equipment, both of which tend to be complex and expensive. However, in accordance with the present teachings, the matter of translating analog information into digital form accurately and economically is uniquely and advantageously approached through techniques which exploit existing common types of precision end devices, such as galvanometers, together with simply-controlled mechanical follow-up apparatus which drives counter and/or printing equipment and which avoids imposing error-inducing forces or torques on the sensitive mechanisms to which they are slaved.

It is one of the objects of the present invention, therefore, to provide novel and improved apparatus of low-cost and uncomplicated construction for the automatic conversions of analog displays of information into digital readouts in terms of indications and/or printed records.

Another object is to provide for the unique digital readout of mechanically-positioned sensitive elements via economical motorized follow-up equipment which directly powers numerical counter and/or printing mechanisms and which is prevented from disturbing the orientations of the positioned elements.

A further object is to provide new and useful apparatus for selectably printing in numerical form the values of data characterized in analog form by a sensitive electrical indicating device, without involving electronic conversions.

It is an additional object to provide selectable digital indications and printings of information characterized by the mechanical orientations of a galvanometer armature or the like, by way of automatic mechanical follow-up equipment which rapidly and accurately seeks these mechanical orientations while they are rigidly clamped and which simultaneously sets and operates a printing-counter unit.

Still further, it is an object to provide simple electromechanical follow-up apparatus which, when manually or automatically triggered into operation, cycles itself to indicate and/or print in numerical form the values of information represented by the positions of analog-type movable members and to reset itself for subsequent like operation.

By way of a summary account of practice of this invention in one of its aspects, an indicating instrument of the D'Arsonval galvanometer type is associated with an electronic moisture-content measurement system, or the like, as an end device, and is equipped with an arresting member, fixed with the movable pointer and armature, and with a mechanical clamping mechanism which is effective to hold the arresting member securely in whatever angular position it may occupy when the mechanism is actuated. A mechanical follow-up unit, angularly movable about the same axis as that of the pointer and arresting member, is set into operation by an electric drive motor once it has first actuated the clamping mechanism, and is turned from a predetermined starting position through an angle which is essentially the same as the pointer deflection angle. Movement of follow-up unit is halted upon engagement of one of its parts with the clamped arresting member, after which a slip-clutch coupling between its unit and the drive motor permits the latter to continue its operation without stalling and, thereby, to control the release of the clamping mechanism, drive a printer, and de-energize itself, after the maximum possible follow-up portion of the cycling has been completed. For purposes of direct numerical displays, and printing, a known form of printing counter is operated in synchronism with the follow-up unit, such that a direct digital readout is achieved each time the apparatus is cycled.

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawings, wherein:

FIG. 1 is a perspective illustration of an improved analog-to-digital conversion and printing instrument, in association with a block-diagrammed measurement system;

FIG. 2 depicts, in plan view, the main chassis of the instrument of FIG. 1, with the top cover removed;

Figures 5, 6:
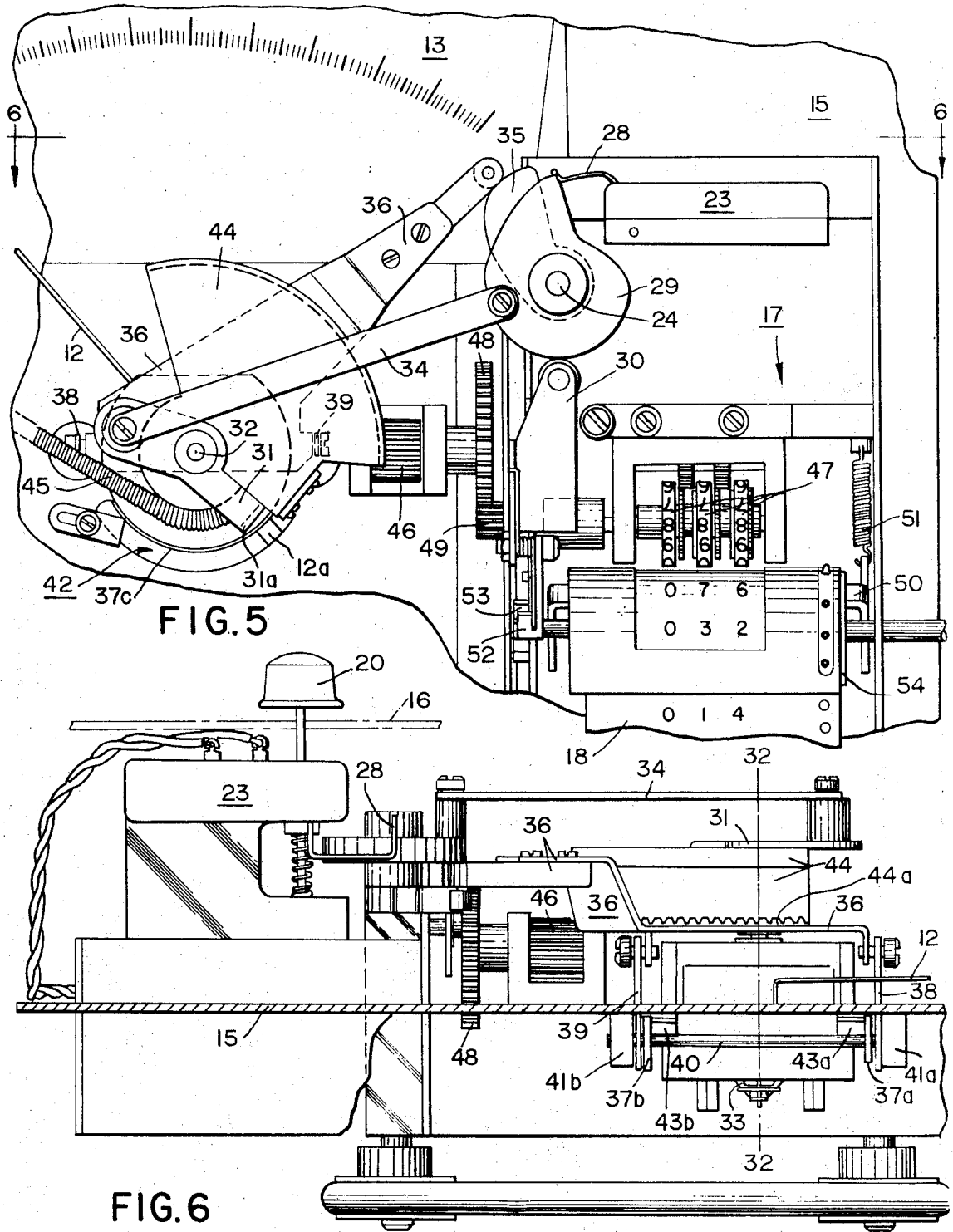
Figure 7A:
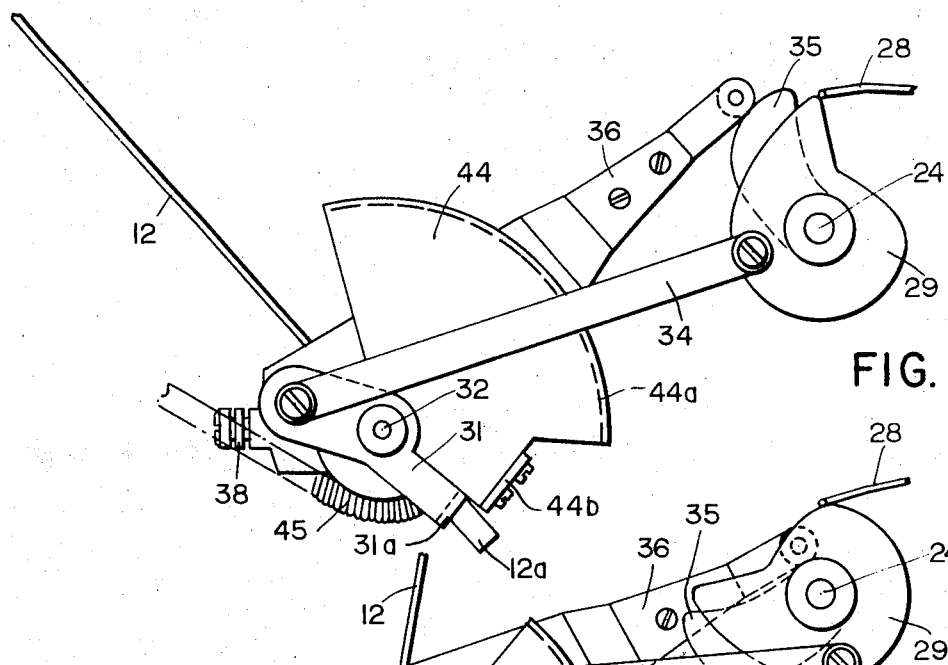
Figure 7B:
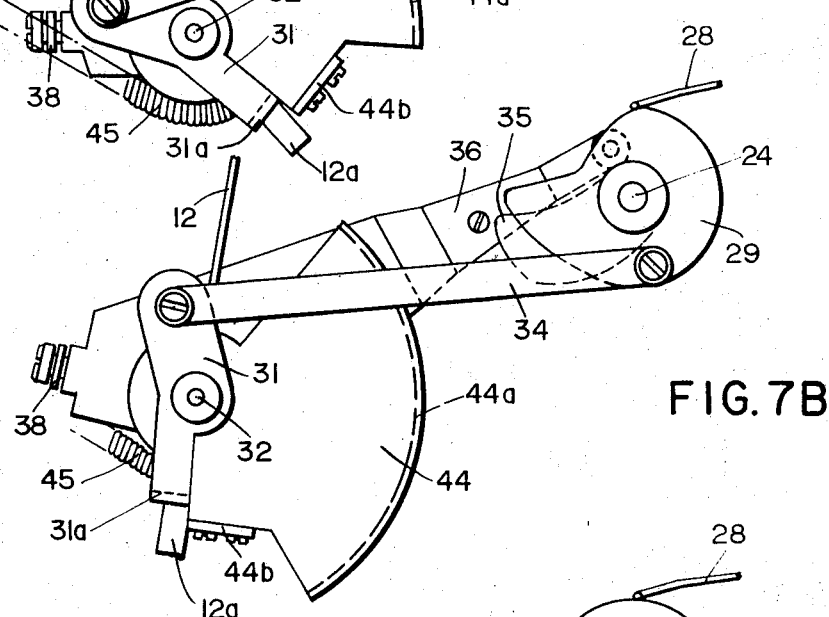
Figure 7C:
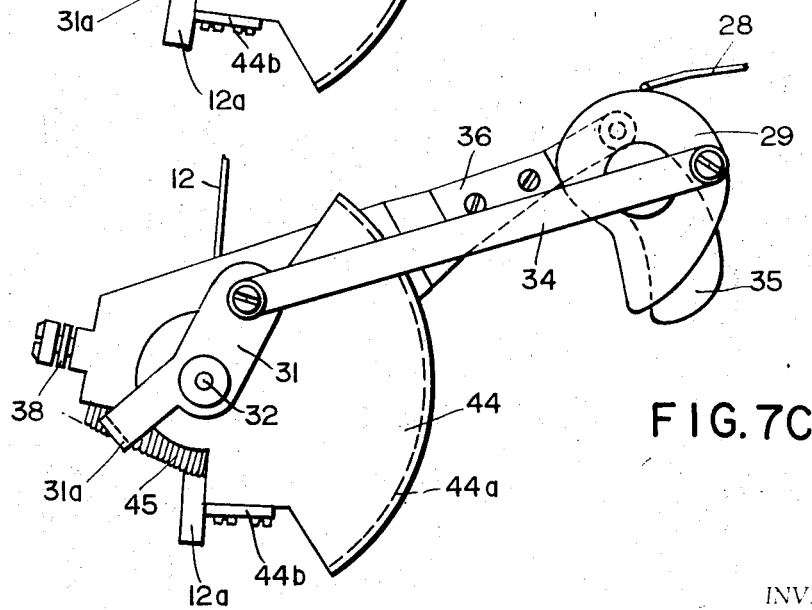

FIG. 3 comprises a detail, viewed from below the chassis, of motive elements and a galvanometer clutching mechanism, of the same instrument;

FIG. 4 provides a detailed side view, in the direction of section lines 4—4 (FIGS. 2 and 3), of certain portions of the follow-up mechanism of the same instrument;

FIG. 5 represents the follow-up mechanism and portions of the printing mechanism of the instrument, in a fragmentary plan view;

FIG. 6 is a side view of the mechanisms of FIG. 5, taken in the direction of section lines 6—6 in FIG. 5; and FIGS. 7A, 7B and 7C illustrate in plan view three successive positions of cam and crank elements during one cycle of clutching and follow-up operations of the same instrument.

The indicating and printing device 8 portrayed pictorially in FIG. 1 is designed to develop both analog and digital numerical displays characterizing the electrical outputs applied to its input terminals 9 via a coupling 10 from equipment 11, the latter being of a known form and type which yields electrical output signals directly related to some value of a sensed condition. Typically, equipment 11 may comprise an electronic moisture-detection system, for example, in which the output signals are related to the capacitivity and, hence, moisture content, of a sample such as a bulk quantity of textile or other material which is under evaluation in a primary detector having the form of a capacitive test cell. Alternatively, it may comprise an electrical system for weighing, pressure-sensing, temperature-sensing, or the like. The electrical analog signals, characterizing the values of the sensed conditions, are translated into visible indications in a generally conventional way by an instrument pointer 12 which is angularly movable in relation to a scaleplate 13 underlying a transparent cover 14; this pointer is oriented in a well-known manner by the moving-coil armature of a D'Arsonval galvanometer unit supported by the inclined chassis or mounting plate 15, a major portion of which is masked by a cover 16. Recessed portion 16a of the cover merges with an opening 16b through which certain parts of a numerical printing-counter mechanism 17 (FIG. 2) are accessible, including the record paper strip 18 withdrawn from a supply roll 19. Push-button 20 may be depressed to initiate a rapid cycle of automatic operations which will cause the printing-counter mechanism to display and imprint upon record strip 18 the digits representing a numerical value corresponding to the measured condition which exists at the time when the member 20 is actuated. As is explained in greater detail later herein, this automatic operation involves re-setting, such that re-cycling and printing of data may be repeated at frequent intervals if desirable.

An electric motor 21 (FIG. 2) is energized via supply line 22 when depression of push-button 20 immediately triggers a doubly-actuated two-position miniature electrical switch 23 to the closed or "ON" condition, and this motor is then effective to rotate an upstanding cam shaft 24 through substantially one full turn, by way of the pulleys 25 and 26 interconnected by a belt 27 (FIGS. 3, 4 and 6). Switch 23, which is of a known form, maintains excitation of the motor after it has been switched "ON" until such time as its actuating member 28, in the form of a cam rider, has been deflected radially outwardly to a predetermined maximum distance from the axis of shaft 24 by the cam 29 fixed with that shaft. At the fully-deflected orientation, actuating member 28 turns the switch "OFF," stopping the electric motor until push-button actuating member 20 may again be depressed; thereafter, the shaft is rotated only through about a full turn once again. Cam 29 transmits actuating power to the printing elements of the printing-counter 17, through the spring-biased reciprocatable cam rider or folower 30, and drives an angularly-movable stop member 31 back and forth through a limited angle about the axis 32—32 of the pointer 12 and moving-coil armature 33 (FIG. 3) by way of an eccentric connecting rod 34 coupled at one end with cam 29 and at the other end with an extension of the stop member. A second cam, 35, is also fixed to and rotatable with the shaft 24, below cam 29 in the illustrated arrangement, and serves to transmit power from motor 21 to an angularly-movable (about axis 32—32) clamp arm 36 which functions as a cam follower and as a means for actuating a yoke-shaped clamp 37 designed and located to engage and firmly lock in position the pointer-clamping extension 12a of the instrument pointer 12.

During each revolution of the power-transmitting shaft 24, the cam 35 causes clamp arm 36 to be oscillated back and forth about pointer axis 32—32 in a single cycle of small-angle movements. At diametrically-opposite positions about that axis, depending short link arms 38 and 39 are loosely connected to the clamp arm 36 (FIGS. 2, 3, 4, 5 and 6), and their respective lower ends are pivotally connected with the opposite sides 37a and 37b (FIGS. 3, 4 and 6) of clamping yoke 37. The latter yoke is pivoted about a shaft 40 mounted in spaced blocks 41a and 41b, at a distance from and transversely to axis 32—32, such that the circularly-curved end 37c of yoke 37 is disposed below the mounting plate 15 and in slgihtly overlapped relationship with the inner periphery of the arcuate slot 42 through the plate 15 (as shown in FIGS. 2, 3, 4 and 5). Leaf springs 43a and 43b (FIGS. 3, 4 and 6) urge the yoke downwardly, as an aid in insuring that the curved clamping end 37c will not tend to remain clamped against the pointer extension 12a and the under surface of mounting plate 15 (FIG. 4). Links 38 and 39, in being simultaneously tilted back and forth in opposite directions by clamp arm 36, cause the clamping yoke first to be raised (from about the position shown in FIG. 4) until it firmly presses against pointer extension 12, locking it firmly against the under surface of plate 15, and then to be lowered again to a position free of the pointer clamping extension 12a. The shaping of cam 35 insures that the aforesaid raising of the yoke and clamping of the pointer will take place during the first part of the cycle associated with turning of shaft 24, and that the pointer will be unclamped by lowering of the yoke before the end of that cycle.

Further, during each revolution of the power-transmitting shaft 24, the eccentric crank arm 34 pivoted on cam 29 causes the movable stop member 31 to traverse an arc about pointer axis 32—32. One end, 31a, of that member serves as a stop for the segmentally-shaped gear rack 44, which is also angularly movable about the pointer axis 32—32 and which is resiliently urged in the clockwise angular direction (FIGS. 2, 5 and 7A-7C) by a coil spring 45 fixed to it and to the chassis 15. Rack 44, which is conveniently fabricated as a plastic element having a toothed metal end 44a serving as the rack, may turn clockwise only in a follow-up manner, as permitted by clockwise movement of the stop end 31a against which it abuts, and is turned counterclockwise against restraint of spring 45 only when so urged by movement of stop end 31a in that direction. Having reference to FIG. 7A, wherein the illustrated parts are poised in the positions which they occupy at the beginning of an operating cycle, it may be noted that stop end 31a prevents clockwise movement of rack 44. After shaft 24 has been rotated about a quarter turn (FIG. 7B), crank arm 34 has moved the stop end 31a clockwise to about half the extent of its intended travel (i.e., about half the angular distance which the pointer 12 and its clamping end 12a may travel), and the rack 44 has followed this travel under influence of spring 45. After the next quarter turn of shaft 24 (the condition shown in FIG. 7C), the stop end 31a has been cranked to the clockwise limit of its travel. In FIG. 7C, the rack 44 has not followed the stop end, however, because the clamping end 12a of pointer 12 has been clamped fast at the mid-scale position (corresponding to a measurement condition of about half the full-scale value, at the time the automatic clamping occurred by way of clamping yoke 37, links 38 and 39, arm 36, and cam 35) and because the rack 44 has instead been stopped by that clamping end 12a. For the latter purpose, the rack unit 44 is provided with a cooperating depending stop element 44b which passes through arcuate opening 42 to a low position (FIG. 4) where it may engage the clamped pointer end 12a at whatever angular orientation it is found to be clamped. The forces exerted by spring 45 are insufficient to overcome the restraint of the clamped pointed end 12a, and are yet sufficient to cause the rack to be turned to the stopped positions and to turn the chassis-mounted pinion 46 (FIGS. 2, 5 and 6) with which the toothed rack is engaged. During the final half turn of shaft 24, the crank arm 34 forces stop end 31a counterclockwise, such that it picks up the rack 44 and returns it, counterclockwise also, to the initial or starting orientation shown in FIG. 7A. In this same last portion of the operating cycle, the cam arm 36 is moved to achieve an unclamping or release of the pointer end 12a, and the switch actuator 28 is articulated to turn the electric motor off and thus end the operation until push-button 20 is depressed again.

The aforesaid pinion 46, actuated by toothed rack 44, is in driving relationship to the printing-counter tumblers or wheels 47 of numerical unit 17, via the intermediate gearing 48 and 49. Depending upon the extents of angular movements of rack 44, which in turn depend upon the deflections of pointer 12 and the related values of the measured conditions, the counter wheels will register digitally the values of the measured conditions. Printing of these numerical values is accomplished by forcing a tiltable printing platen 50 (FIG. 5) away from the counter and paper 18 with follower 30 as sliding movement of the cam follower 30 occurs during the rotation of cam 29, and by then causing this platen to be suddenly and forcefully snapped, by tensed spring 51, against the back of the pressure-sensitive paper confronting the type on the wheels 47 when stop end 31a has just passed the point of maximum travel of rack 44 (which corresponds to the point where the pointer clamping end 12a is deflected when the pointer is at the full-scale position). A simple fixed catch (not visible) slidable with reciprocatable follower 30 conveniently serves to deflect and release the spring-biased platen. Also slidable with the follower 30 is a spring-biased pawl 52, which engages a ratchet wheel 53 on the drum 54 and thereby causes the pressure-sensitive paper record 18 to be advanced in position by a small amount after each printing occurs and before the next-succeeding printing cycle can take place. A spring 55 (FIG. 2) serves to maintain slidable reciprocatable follower 30 in engagement with the actuating cam 29. Knob 56 permits the drum 54 to be turned manually, to advance the record independently of the automatic operation, if desired. Conventional inking or ribbon provisions may of course be substituted, as alternatives to the use of the known form of pressure-sensitive record paper. Microswitch 23 may be actuated automatically, in a periodic manner or as changed conditions warrant, rather than manually by way of the push-botton 20, and the printing may routinely be caused to include other data, such as the time or identifying symbol, along with the numerical readout information. Any desired number of digits may be accommodated. In some instances the displays may be in other than numerical form, such as symbolic or special digital coding, and an alarm or signalling may be made of measured values within or outside of a predetermined range or level.

The mechanical amplifications realized in the automatic follow-up of the positions of the low-torque galvanometer movement permit the mechanism to be used to develop a valuable gain without involving complex electronic servo equipment, and the relatively high-force mechanical outputs may thus be exploited for a variety of purposes which are not restricted to actuations of a printing counter only. Advantageously, the drive motor may be of a relatively inexpensive non-reversible type, which need not have its speed closely regulated and which requires merely a simple On-Off control instead of excitation by a servo amplifier. Counting may also be performed electrically, rather than by the illustrated wholly mechanical counter; by way of example, the follow-up element (rack) may either cause a wiper to engage successive electrical contacts disposed in its path of travel or may cause an electrical switch to open and close a number of times corresponding to the length of its travel, and the resulting electrical impulses may be totalled by a known form of electronic or electromagnetic impulse counter. Clamping of the movable indicator may be achieved in alternative ways. such as by electrical solenoid actuations, and the follow-up member may be directly driven by a motor in a design wherein it is provided with a suitable slip-clutch which will prevent jamming when stopping occurs. Accordingly, it should be understood that the embodiments and practices described and portrayed have been presented by way of disclosure, rather than limitation, and that various modifications, substitutions and combinations may be effected without departure from the spirit and scope of this invention in its broader aspects.

What I claim as new and desired to secure by Letters Patent of the United States is:

1. Conversion apparatus comprising condition-responsive means including a galvanometer having an armature the different angular positions of which characterize different values of sensed conditions, a stop member angularly movable with said armature, means for selectably clamping said stop member in a direction generally perpendicular to the plane of rotation of said armature and in whatever angular positions it is disposed by said armature, a follow-up member angularly movable along a predetermined path from a fixed position to positions of stopped engagements with said stop member, cycling means for moving said follow-up member from said fixed position into engagement with said stop member while it is clamped in position by said clamping means and for subsequently moving said follow-up member back to said fixed position, a digital counter, and means driving said counter in synchronism with angular movements of said follow-up member, said cycling means including an electric motor connected in driving relation to a shaft, said clamping means including toggle means for selectably clamping said stop member between two opposed surfaces substantially without imposing torques on said glavanometer armature, first cam means rotatable with said shaft, cam-follower means actuated by said cam means and actuating said toggle means to first clamp and subsequently release said stop member between said surfaces during each turn of said shaft, and electric switch means actuatable to energize said motor and including means responsive to each turn of said shaft to de-energize said motor automatically.

2. Conversion apparatus as set forth in claim 1 wherein said means for moving said follow-up member into engagement with said stop member and back to said fixed position comprises means actuated by said motor during each turn of said shaft and synchronously moving said follow-up member into said engagement after said toggle means first clamps said stop member and before said toggle means releases said stop member.

3. Conversion apparatus as set forth in claim 2 wherein said counter includes a rotatable numerical counter, wherein said follow-up member comprises a circularly-curved gear member movable angularly about the axis of said galvanometer armature, and pinion gear means rotated by said gear member and connected in driving relationship to said counter.

4. Conversion apparatus as set forth in claim 3 further comprising a printer including printing means movable toward and away from printing engagement with said counter, and means actuated by said motor during each turn of said shaft and synchronously moving said printing means into said printing engagement while said follow-up member is in engagement with said stop member and thereafter moving said printing means out of said engagement before said follow-up member is urged back to said fixed position.

5. Conversion apparatus as set forth in claim 4 wherein said printer includes spring-actuating means for moving said printing means into said printing engagement, and wherein said means synchronously moving said printing meas includes second cam means rotatable in synchronism with said shaft, and second cam follower means actuated by said second cam means for loading and controlling said spring-actuating means.

References Cited
UNITED STATES PATENTS

| | | | |
|---|---|---|---|
| 1,573,950 | 2/1926 | Torgersen | 340—194 |
| 2,023,221 | 12/1935 | Fischer et al. | |
| 2,467,948 | 4/1949 | Strum et al. | |
| 2,957,743 | 10/1960 | Terry | 346—98 XR |
| 3,216,019 | 11/1965 | Melton et al. | 346—31 XR |
| 2,188,100 | 1/1940 | Frymoyer | 235—61 XR |
| 2,264,370 | 12/1941 | Harrison | 346—31 XR |

RUDOLPH V. ROLINEC, Primary Examiner

E. F. KARLSEN, Assistant Examiner

U.S. Cl. X.R.

346—31